United States Patent
Rossi et al.

(10) Patent No.: US 11,929,650 B2
(45) Date of Patent: Mar. 12, 2024

(54) ELECTRIC MACHINE WITH MORE PRECISE MEASUREMENT

(71) Applicant: SAFRAN ELECTRONICS & DEFENSE, Boulogne-Billancourt (FR)

(72) Inventors: Alberto Rossi, Boulogne-Billancourt (FR); Jérôme Piaton, Boulogne-Billancourt (FR); Benjamin Daguse, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 436 days.

(21) Appl. No.: 17/286,043

(22) PCT Filed: Oct. 23, 2019

(86) PCT No.: PCT/FR2019/052536
§ 371 (c)(1),
(2) Date: Apr. 16, 2021

(87) PCT Pub. No.: WO2020/084260
PCT Pub. Date: Apr. 30, 2020

(65) Prior Publication Data
US 2021/0391773 A1 Dec. 16, 2021

(30) Foreign Application Priority Data
Oct. 23, 2018 (FR) ...................... 1859769

(51) Int. Cl.
*H02K 11/215* (2016.01)
*H02K 1/14* (2006.01)
(Continued)

(52) U.S. Cl.
CPC .......... *H02K 11/215* (2016.01); *H02K 1/146* (2013.01); *H02K 1/278* (2013.01); *H02K 11/33* (2016.01); *H02K 29/08* (2013.01)

(58) Field of Classification Search
CPC ...... H02K 11/215; H02K 1/146; H02K 1/278; H02K 11/33; H02K 29/08
(Continued)

(56) References Cited

U.S. PATENT DOCUMENTS

2006/0123903 A1* 6/2006 Gandel .................. G01L 3/104
73/328
2007/0252487 A1 11/2007 Fuji et al.
(Continued)

FOREIGN PATENT DOCUMENTS

DE 112017000172 T5 7/2018
EP 0565312 A2 10/1993
(Continued)

OTHER PUBLICATIONS

FR-2942922-B1 (Year: 2019).*
(Continued)

*Primary Examiner* — Ahmed Elnakib
(74) *Attorney, Agent, or Firm* — Sughrue Mion, PLLC (57) ABSTRACT

The invention relates to an electric machine comprising a rotor and a stator. The rotor (40, 4) comprises a plurality of permanent magnets (4), the stator comprises a plurality of coils suitable for being powered by an electric current and two Hall effect sensors (6) on supports (60). The sensors are configured to detect a change in gradient of the normal component of a magnetic field generated by the permanent magnets (4). The stator comprises a part (7) comprising —a first zone (7a), —a second zone (7b), and a third zone (7c) extending from the first zone (7a) up to the second zone (7b). The maximum radial thickness of the third zone (7c) is less than the minimum radial thickness of the first zone and the second zone.

9 Claims, 5 Drawing Sheets

(51) Int. Cl.
    *H02K 1/278*     (2022.01)
    *H02K 11/33*     (2016.01)
    *H02K 29/08*     (2006.01)

(58) Field of Classification Search
    USPC ........................................................ 310/68 B
    See application file for complete search history.

(56) References Cited

U.S. PATENT DOCUMENTS

| | | | |
|---|---|---|---|
| 2014/0009044 A1* | 1/2014 | Taniguchi | H02K 15/0435 310/68 B |
| 2017/0067964 A1* | 3/2017 | Dumas | B60L 9/22 |
| 2017/0288509 A1* | 10/2017 | Oya | H02K 11/0094 |
| 2019/0157929 A1* | 5/2019 | Cho | H02K 7/14 |
| 2020/0136477 A1* | 4/2020 | Amagi | H02K 21/16 |
| 2021/0391773 A1* | 12/2021 | Rossi | H02K 11/215 |

FOREIGN PATENT DOCUMENTS

| | | | |
|---|---|---|---|
| FR | 2894092 | * | 6/2007 |
| WO | 2015/124876 A1 | | 8/2015 |

OTHER PUBLICATIONS

FR-3032841 (Year: 2016).*
DE-102016116766 (Year: 2022).*
CN-112260488 (Year: 2021).*
FR-3080679 (Year: 2020).*
French Preliminary Search Report dated Sep. 10, 2019 in Application No. 1859769.
International Search Report dated Feb. 6, 2020 in Application No. PCT/FR2019/052536.

* cited by examiner

ELECTRIC MACHINE WITH MORE PRECISE MEASUREMENT

CROSS REFERENCE TO RELATED APPLICATIONS

This application is a National Stage of International Application No. PCT/FR2019/052536 filed Oct. 23, 2019, claiming priority based on French Patent Application No. 1859769 filed Oct. 23, 2018, the entire contents of each of which are incorporated by reference in their entireties.

TECHNICAL FIELD OF THE INVENTION

The invention belongs to the technical field of electrical machines, particularly of the synchronous type, controlled in motor mode to generate a mechanical torque.

The invention has a particular advantageous application for synchronous brushless machines in which the position of the rotor is measured by magnetic sensors, such as Hall-effect sensors.

PRIOR ART

A synchronous motor produces a mechanical torque when the stator windings are supplied with electrical current and rotate the magnetic elements of a rotor. In one widespread configuration, the stator is a hollow cylinder and the magnetic elements of the rotor pivot inside the stator around its axis of rotation.

In a brushless or "self-driven" synchronous motor, the supply currents of the stator windings are controlled depending on the angular position of the rotor around its axis.

The direction of the magnetic field produced by the rotor at a particular point varies depending on the angular position of the rotor.

Thus, to detect the angular position of the rotor, it is known to position, on the same section plane of the stator, magnetic sensors such as Hall-effect sensors. These sensors can measure the orientation of a normal component of the magnetic field.

Figure 1:
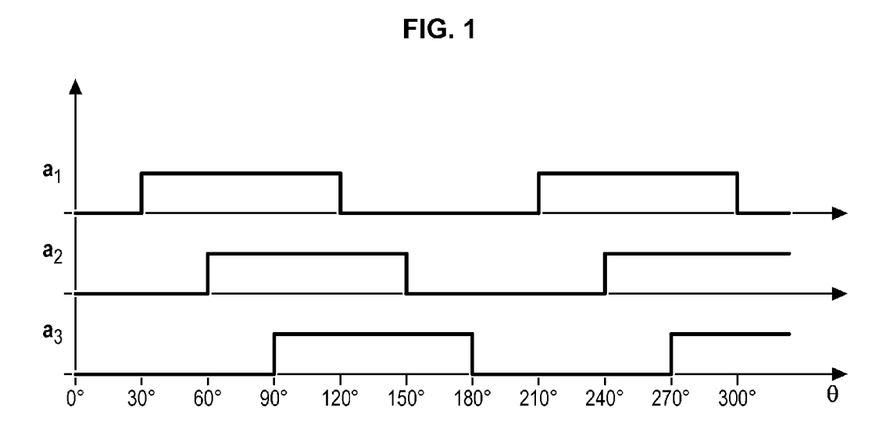

FIG. 1 shows, from top to bottom, position signals a1, a2, a3 acquired at the terminals of three Hall-effect sensors separated by 60°, depending on the angular position θ of a given radius of the rotor, in a configuration with three stator windings.

In this figure, the time-slot position signal at the terminals of a sensor causes a transition during a change of orientation of a component of the magnetic field which is normal to said sensor.

However, the measurement supplied by a Hall-effect probe according to the aforementioned principle can suffer from uncertainty. This measurement uncertainty depends in particular on the size of the electrical machine and on its operating speed. It can attain several degrees, for example up to 5 degrees.

Yet, when the rotor is located near the polarity inversion position of a Hall-effect sensor, the absolute values of the magnetic field perceived by the sensor are near zero in comparison to this range of uncertainty.

Thus, in cases of extreme measurement errors, the sensor can detect a change in polarity when the rotor has not passed the polarity inversion position, or conversely.

The determination of the position of the rotor can then be erroneous, resulting in a non-optimal current control of the windings (which can cause torque oscillations, i.e. non-negligible variations between the real value of the supplied motor torque and the nominal value).

Another problem posed by the actual use of Hall-effect probes is a possible error in adjusting the probes. By way of an example, if the probes are supposed to have an angular separation of 60° two by two, one probe may be offset and have a separation different from 60° from the adjoining probes.

Yet the measurement of magnetic polarity supplied by Hall-effect sensors is very sensitive to the inclination and to the position of the sensors.

The determination of the position of the rotor is then erroneous. Motor torque oscillations might occur, even in the hypothetical case where the measurement of magnetic polarity at the sensors would not suffer from uncertainty.

A known solution for improving the adjustment of the Hall-effect probes consists of creating probe receptacles in the stator and gluing each probe into a receptacle. This solution is not entirely satisfactory, however, because the probe can become offset if clearance exists in the housing. Moreover, this solution does not solve the aforementioned problem of measurement uncertainty. The detection of the angular position of the rotor remains too imprecise.

The observed level of motor torque oscillations remains unacceptable for numerous practical applications.

GENERAL PRESENTATION OF THE INVENTION

There exists a need for an electric motor for which the information supplied by the magnetic rotor position sensors is reliable, so as not to generate motor torque oscillations.

There is a particular need for a solution which is suited to synchronous motors with Hall-effect sensors for detecting the position of the rotor.

Preferably, the solution sought must have a small mass and bulk, allowing its use in numerous technical contexts and particularly in aeronautics.

To address the above needs, the invention relates to an electrical machine according to claim 1.

The electrical machine of the invention has several advantages.

The part added at the stator creates an amplification zone of the normal component of the magnetic field, in particular of a gradient of the normal component of the magnetic field, in proximity to the detection surface of the magnetic sensor. Thus, for the same angular displacement of the rotor, the variation of said normal component of the field is greater. The uncertainty of the measurement supplied by the sensor therefore has a smaller impact on the detection of the polarity inversion position.

The precision of detection of the polarity inversion position of the rotor is thus increased, without changing the magnetic sensor.

In addition, the addition of the magnetic field amplifying part does not require modifying in depth the architecture of the electrical machine. The field amplifying part can for example simply be interleaved between the magnetic sensor and the stator.

A simple solution for improving the electromagnetic performance of the electrical machine is thus available, without strongly congesting or weighing down the system.

In addition, the magnetic field amplifying metal part, which is contiguous, ensures that the angular separation between the two magnetic sensors is congruent. It is possible to adjust the position of a single amplifying part, instead of adjusting several separated sensors. In addition, the presence of a reduced third radial thickness zone allows avoiding having the magnetic field saturate at the first zone and the second zone of the part, the first zone and the second zone being positioned in proximity to the magnetic sensors.

The machine of the invention can have the following non-limiting additional features, taken alone or in any one of the technically possible combinations:—the machine comprises a first magnetic sensor and a second magnetic sensor positioned in the same section plane orthogonal to an axis of rotation of the rotor of the machine, the part being contiguous and comprising a first amplification zone extending in a first angular sector of the machine in which the first sensor is positioned as well as a second amplification zone extending in a second angular sector of the machine in which the second sensor is positioned.

One advantage of this variant is that both the impact of the uncertainty of sensor measurements and the probability of adjustment errors of one of the sensors are limited. The magnetic field amplifying part, which is contiguous, plays the role of amplifying the magnetic field for several sensors. This thus ensures that the angular separation between the two sensors is congruent. It is possible to accomplish the adjustment of a single amplifying part instead of the adjustment of several separated sensors. With this variant, the errors in detecting the angular position of the rotor are further reduced;

in this last variant, a third zone of the part extends from the first zone until the second zone, a maximum radial thickness of the third zone in the orthogonal section plane being less than a minimum radial thickness of the first zone and a minimum thickness of the second zone in the orthogonal section plane.

One advantage of this additional feature is to avoid having the magnetic field saturating the first zone and the second zone of the part;

the first angular sector on which the first amplification zone extends has an angular amplitude comprised between 10° and 30°, preferably 20°;

the part has the shape of a ring or the shape of a ring sector;

the machine comprises magnetic sensors each distributed in proximity to a field amplification zone and at angular positions spaced regularly along a perimeter of the machine;

the machine comprises six magnetic sensors spaced two by two at 60°;

the magnetic sensors are interleaved between the part and the rotor and are mounted fixedly on the part;

a magnetic sensor comprises a Hall-effect probe;

a magnetic element of the rotor comprises a permanent magnet or an electromagnet; —the electrical machine also comprises a device for controlling an electrical current circulating in the windings, the control device being configured to control a frequency of an electrical current within one of the windings depending on a polarity change signal transmitted by a magnetic sensor;

in this last variant, the machine comprises three windings configured to operate with a three-phase current supply, the control device being configured to generate via the windings an electromotive force of the trapezoidal type in order to generate a rotation of the rotor relative to the stator.

GENERAL PRESENTATION OF THE FIGURES

Other features, aims and advantages of the invention will be revealed by the description that follows, which is purely illustrative and not limiting, accompanied by FIG. 1 already commented above as well as the other appended drawings, among which.

DETAILED DESCRIPTION OF EMBODIMENTS

In the following description and in the appended drawings, similar elements are associated with the same numerical references.

What is meant by "magnetic elements" are the elements responsible for the rotation of the rotor during motor operation, by interaction with the magnetic field of the stator; the magnetic elements can in particular be permanent magnets or electromagnets supplied with direct current.

Moreover, in all the following, particular examples of the implementation of the invention in the case of a synchronous machine in motor operation are described, in which the rotation speed of the rotor depends on the frequency of the electrical current applied to the windings. Here the stator extends outside the rotor.

However, the invention applies with the same advantages for another synchronous machine architecture, for a synchronous machine operating as a generator, or for any other type of electrical machine in which the angular position of the magnetic elements must be measured.

Figure 2:
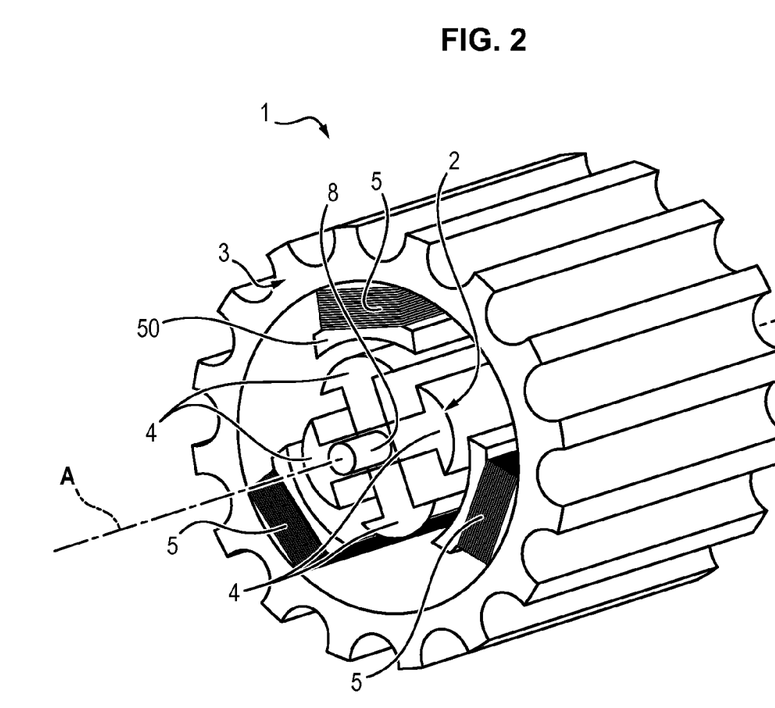
FIG. 2 is a perspective view of a synchronous machine of the prior art comprising a stator with three windings and a permanent-magnet rotor.

Shown in FIG. 2 is a synchronous machine 1 according to one embodiment, which can be used in an aircraft engine.

The machine 1 comprises a rotor 2 with permanent magnets and a stator 3 in the shape of a hollow cylinder extending around the rotor 2.

The rotor 2 comprises magnetic elements, here four permanent magnets 4 spaced 90° two by two, in which two facing magnets have a "north" polarity and two facing magnets have a "south" polarity. As an alternative, a different number of magnetic elements could be provided. The rotor 2 has one degree of freedom of rotation around a shaft 8 of the rotor along an axis A.

Facing the magnets 4 of the rotor, the stator 3 has, on an inner surface, stator windings 5. The windings 5 are able to be supplied with an electrical current and to drive the rotor in rotation relative to the stator, due to the interaction between the magnetic field of the windings and the magnetic field of the magnetic elements of the rotor. Here, the machine 1 comprises three windings 5 spaced by 120° two by two around the axis A. Each winding is wrapped around a magnetic pole of the stator and is limited toward the interior by a surface 50 facing the rotor.

In motor operation, the power supply to the stator windings creates a magnetic flux with interacts with the magnetic field of the rotor magnets and causes the rotor to rotate. A frequency of the current supplied to the windings determines a speed of rotation of the shaft 8 of the rotor.

In generator operation, an external mechanical torque is applied to the rotor. The magnetic flux varies within the windings and induces an electrical current in the windings which can be recovered.

In the example that follows, motor operation is assumed.

The machine 1 has three windings 5 supplied with three-phase current by an electrical power supply control device (not shown in the figures).

The electromotive force at a given winding depends on the voltage at its terminals. A mechanical torque at the shaft 8 corresponding to a predetermined setting, for example a constant torque, is sought. To this end, the orientation of the electrical current at the terminals of each of the windings is commuted in a manner synchronized with the rotation of the rotor.

For a given winding, when the rotor exceeds a predetermined angular position, it is known that the magnetic field within the winding has changed (for example, if the interface between a "north" magnet and a "south" magnet has passed in front of an axis of the winding) and that it is necessary to commute the orientation of the current at the terminals of said winding.

It is therefore necessary to supply to the electrical power supply control device very precise information about the position of the rotor. In fact, if the position information supplied to the electrical power supply control device is imprecise, the voltages of the windings are commuted at the wrong time. The stator and the rotor are no longer synchronous and motor torque oscillations are generated.

To accomplish the position measurement of the rotor, it is possible to place, on a plane axially offset relative to the surfaces 50 of the rotor, magnetic rotor position sensors (not shown in FIG. 2). Said axial offset extends along the axis A of the electric motor.

Typically, the rotor 2 extends over an axial extension beyond the windings 50 (this extension not being illustrated in FIG. 1). The magnetic rotor position sensors are positioned facing said axial prolongation, and are spaced axially relative to the surfaces 50.

In a preferred embodiment, the magnetic rotor position sensors are Hall-effect sensors.

Depending on the orientation of the magnetic field component normal to the sensor, the potential difference at the terminals of the sensor is positive or negative. What is meant by "normal component" is the projection of the total magnetic field detected by the sensor onto one axis of the sensor orthogonal to the sensor pad. The sensor pad forms a surface for detection of the normal component of the magnetic field. The sensor can therefore detect a change of position of the rotor which causes a change in orientation of the normal component.

As an alternative, it is possible to use other types of magnetic sensors, for example inductive sensors.

The electrical power supply control device controls the displacement of the rotor along its period. The electrical power supply control device can be configured to generate, at the stator windings, an electromotive force of the trapezoidal type.

Figure 3:
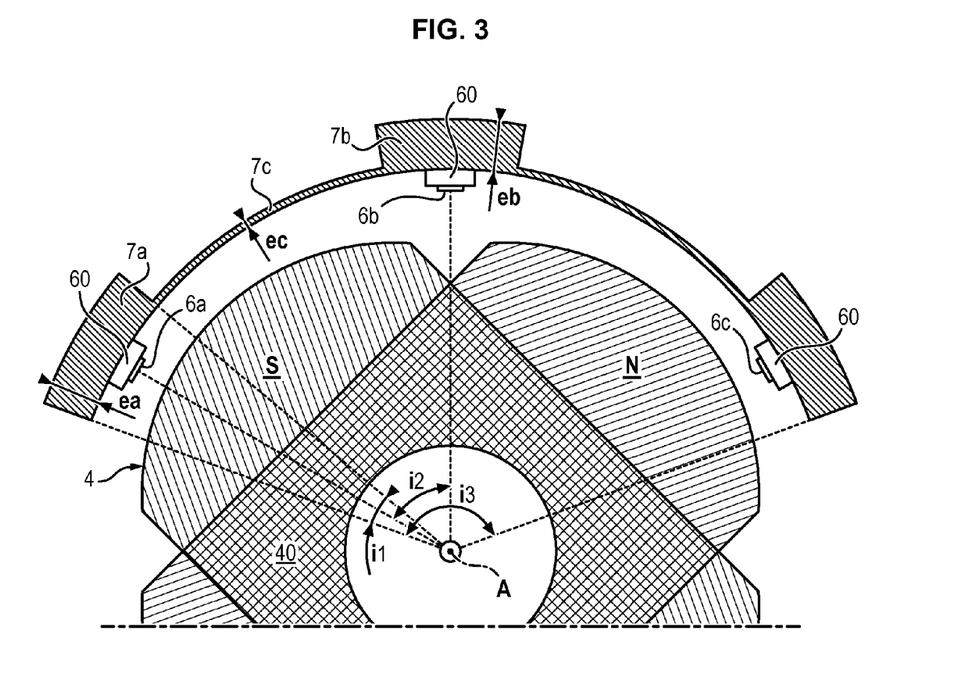
FIG. 3 is a partial section schematic of a synchronous machine according to a first embodiment of the invention, with a section plane perpendicular to the axis of rotation of the machine.

Shown schematically in FIG. 3 is one half of a synchronous machine according to one embodiment of the invention, shown in section along a section plane orthogonal to the axis A of the rotor 2. The rotor 2 comprises magnetic elements, here four permanent magnets 4 at the periphery of a non-magnetized zone 40.

The section plane passes through three Hall-effect sensors 6a, 6b and 6c placed on respective surfaces 60 facing the rotor.

Figure 4:
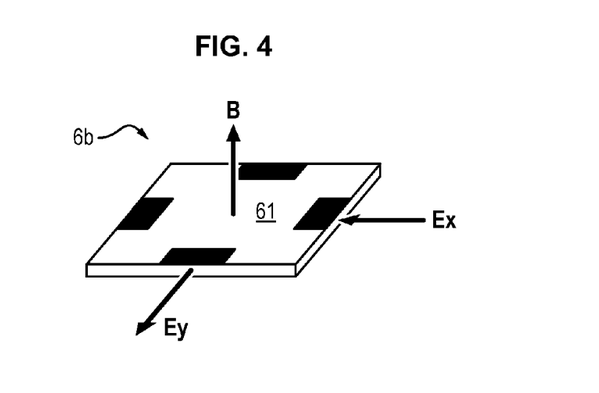
FIG. 4 shows schematically a Hall-effect sensor.

FIG. 4 shows the Hall-effect sensor 6b. The hall-effect sensor comprises a pad 61 at the terminals of which a voltage Ex is applied. The pad 61 forms a surface for detecting the normal component of the magnetic field exerted on the sensor.

When the sensor 6b is subjected to a magnetic field having a component normal to the detection surface, bearing reference symbol B in the figure, a potential difference Ey appears at the terminals of the sensor. The sign of the potential difference Ey corresponds to the orientation of the normal component of the field relative to the detection surface.

Returning to FIG. 3, each of the Hall-effect sensors must be oriented such that a change in orientation of the component normal to the terminals of a sensors corresponds to a passage of an interface between a north magnet of the rotor (bearing reference symbol N in the figure) and a south magnet of the rotor (bearing reference symbol S).

The angular separation i2 between sensors 6a and 6b is 60°. Likewise, the angular separation between sensors 6b and 6c is 60°.

In FIG. 3, the rotor is located at an angular position where the sensor 6a and the sensor 6c to not perceive a change in the orientation of the normal component of the field.

On the other hand, the normal component of the magnetic field on the sensor 6b is nil. In the condition shown in FIG. 3, the sensor 6b must therefore perceive an inversion of the orientation of the normal component of the field.

However, the measurement of the Hall-effect sensor 6b is affected by uncertainty. The sensor 6b is therefore likely to perceive a change of polarity at a slightly offset, to the right or to the left, position of the rotor, relative to the position shown in FIG. 3.

In conformity with the invention, the electrical machine comprises a part 7, integral with the stator 3. The part 7 comprises a zone 7b configured to amplify the normal component of the magnetic field at the magnetic sensor 6b, in particular the gradient of the normal component of the magnetic field.

In a preferred manner, the part 7 faces an axial extension of the rotor 2, said extension extending beyond the windings of the stator 3. Thus the part 7 is spaced axially from the windings of the stator 3, said axial spacing understood to be relative to the axis of the motor.

Zone 7b is typically a sector of a metal cylinder, of iron for example. Here zone 7b has a thickness eb. The thickness 3b is for example several millimeters, preferably between 1 and 20 millimeters, even more preferably between 5 and 10 millimeters. Zone 7b is placed behind the surface 60 which carries the sensor 6b, integrally with the stator.

Thus, for the same position of the rotor, the normal component of the field perceived by the sensor 6b is increased in absolute value. The impact of the uncertainty range of the sensor 6b on the detection of the change in polarity is therefore less.

By way of example, if the uncertainty range of the sensor 6b is 0.05 Tesla, the sensor 6b can detect a change of orientation of the normal component of the field, when the normal component does not change in orientation and is comprised between −0.05 Tesla and 0.05 Tesla.

In the presence of the zone 7b, the normal component of the magnetic field is amplified. The same angular displacement of the rotor therefore causes a greater variation of the normal component at the sensor. Thus, the same uncertainty for the change in polarity (from −0.05 Tesla to 0.05 Tesla) gives a small range of uncertainty of the rotor position (for example from −0.1° to 0.1°).

The amplification of the field by the zone 7b of the part 7y therefore improves the synchronization of the commutation of the current in the windings. The induced rotation movement of the rotor is better controlled.

It will be noted that, due to this solution, the precision of measurement of the Hall-effect sensors is improved, without modifying either the sensors, or the electronics for controlling the current in the stator windings.

Not necessarily but advantageously, the part 7 comprises two field amplification zones 7a and 7b corresponding to two sensors 6a and 6b. One zone 7c of the part extends from zone 7a until zone 7b. The part 7 is contiguous between zones 7a and 7b.

The fact of having two amplification zones corresponding to two distinct Hall-effect sensors, with a connection within the part 7 between the two zones, facilitates the adjustment of the sensor positions. Instead of separately adjusting the position of the two sensors, the angular position of a single element (the part 7) is adjusted relative to the rotor.

This configuration of the part 7 therefore allows guaranteeing a better orientation and a correct angular separation between the two sensors (60° here). The precision of the position information on the rotor supplied by the Hall-effect sensors is further increased.

It will be understood that it is even more advantageous to have on the same part 7 three zones for amplifying the magnetic field corresponding to three sensors, as in FIG. 3. A correct angular separation between three sensors is thus guaranteed.

In this example, the part 7 has the shape of a ring sector and covers the three magnetic sensors 6a, 6b and 6c. An angular amplitude i3 of the part 7 is greater than 120°, here approximately 140°.

But alternatively, the part 7 could correspond to single Hall-effect sensor, for example by being limited to zone 7b.

Preferably, a maximum radial thickness ec of zone 7c, along the section plane of FIG. 3, is less than a minimum radial thickness ea of zone 7a as well as a minimum radial thickness eb of zone 7b. Preferably, the thickness ec is less than 50% of the thickness 7a and of the thickness 7b (comprised for example between 20% and 40%).

For example, the thickness ec is comprised between 1 and 3 millimeters.

The "thinner" zone 7c saturates more easily, by contrast with zones 7a and 7c which undergo little saturation.

Zone 7c channels the magnetic field produced by the magnets 4. The magnetic field is therefore more intense in zone 7c.

One advantage of this configuration is to reduce the risk of saturation of the zones located behind the sensors (zones 7a and 7b here). The saturation of these zones could disturb the interaction between the magnetic fields of the rotor and of the stator, and disturb the angular movement of the rotor.

In the example of FIG. 3, the angular sector i1 on which the elevated thickness zone 7a extends, has an amplitude comprised between 10° and 30°, preferably 20°. Likewise, zone 7b has an angular amplitude in proximity to 20°. The remaining angular sector (approximately 40°) is occupied by a zone 7c of small thickness.

Figure 5:
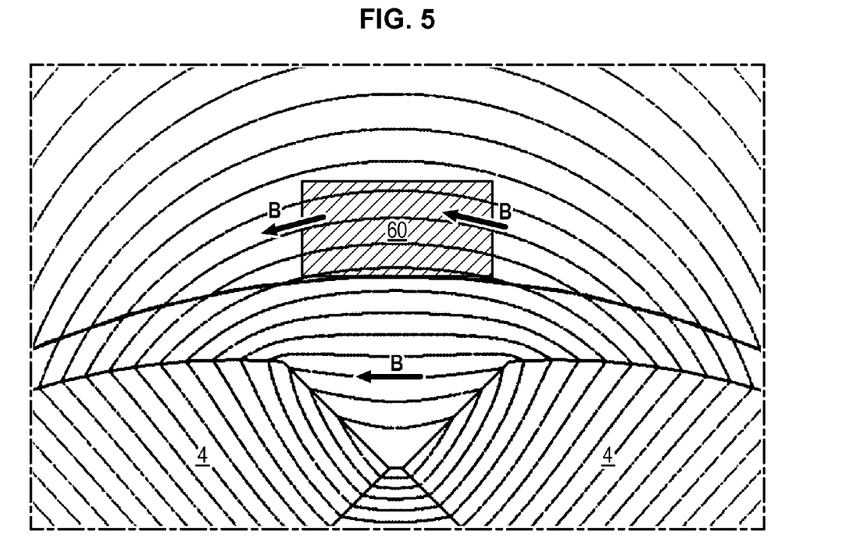
FIG. 5 is a map of the magnetic field at the interface between the rotor and the stator in a machine not equipped with a magnetic field amplifying part.

To illustrate the amplification of the magnetic field by the part 7 and the phenomenon of saturation, FIG. 5 shows a magnetic field map in proximity to the sensor 6b without the part 7, when the rotor is in the angular position shown in FIG. 3. Shown in FIG. 6 is a magnetic field map in proximity to the sensor 6b with the part 7 added.

In these two figures, the north magnet is in the lower right and the south magnet is in the lower left. Thus, the magnetic field B in the air gap is oriented from right to left. The zone 60 of the bearing surface of the Hall-effect sensor is shown in the two figures.

Figure 6:
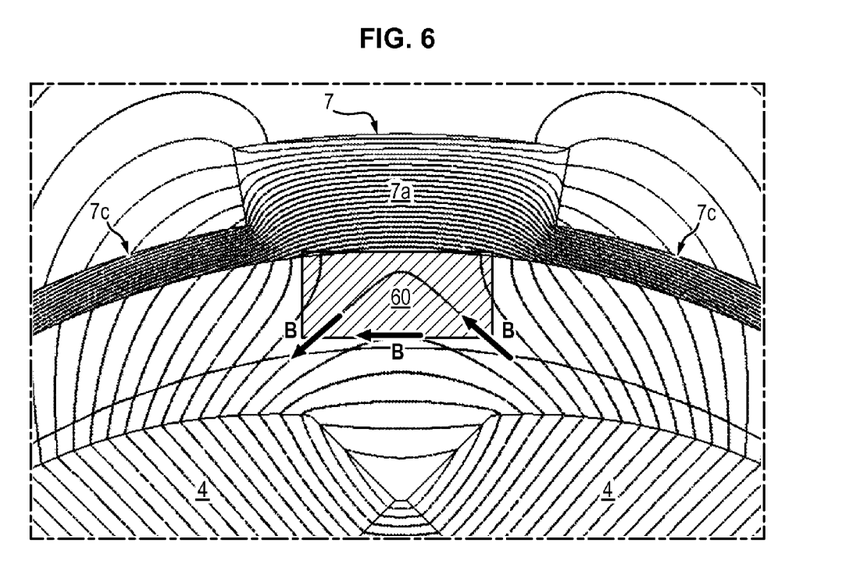
FIG. 6 is another magnetic field map at the interface between the rotor and the stator in a machine having a magnetic field amplifying part.

It is noted that the magnetic field is deformed vertically at the zone 60 in FIG. 6. The presence of the part 7 and particularly of the amplification zone 7a deforms the lines of the magnetic field upward.

Due to the zone for amplification of the normal component of the magnetic field, particularly of the gradient of the normal component of the magnetic field, the change of direction of the magnetic field lines (i.e. the inversion of polarity of the magnetic field) is more concentrated at the center of the Hall-effect sensor. The gradient of the normal component of the magnetic field is increased in the zone 60 in FIG. 6, relative to the configuration of FIG. 5 without an amplifying part.

Figure 7:
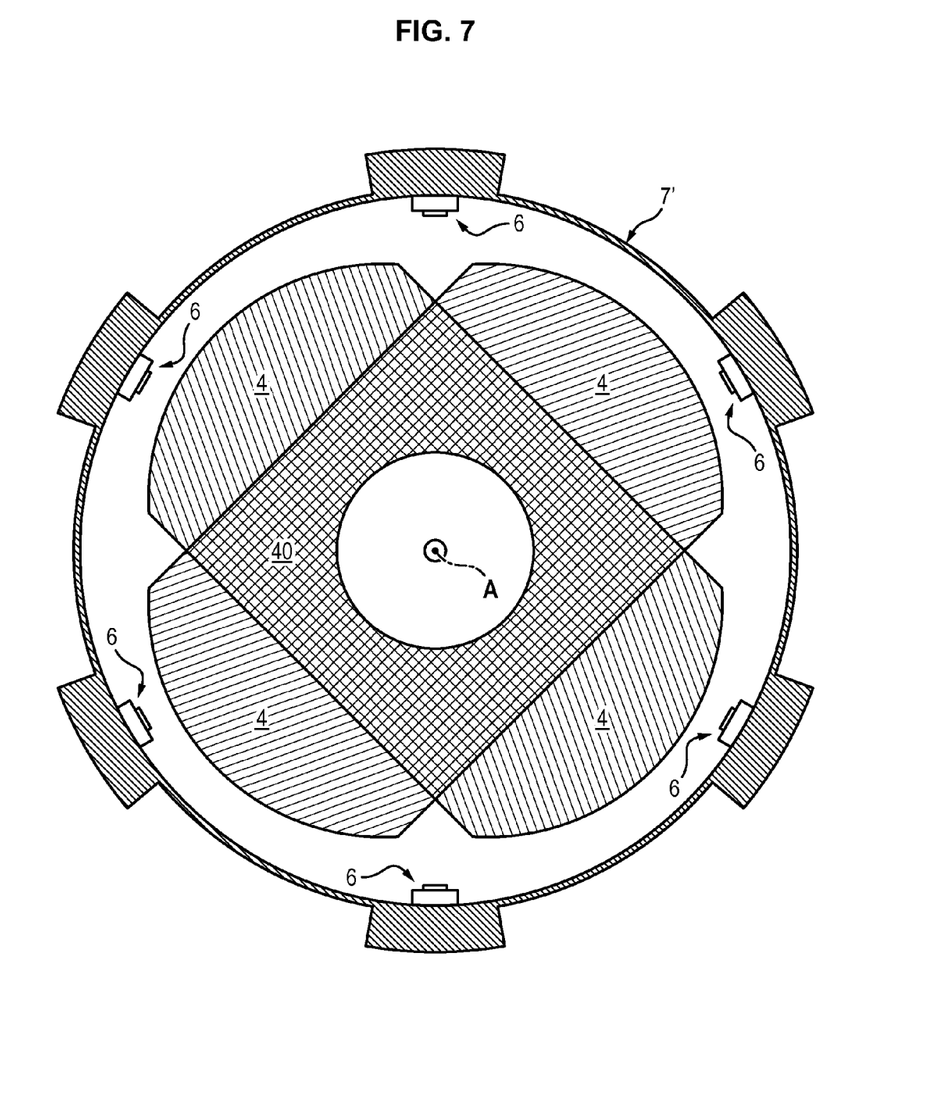
FIG. 7 is a partial section schematic of a synchronous machine according to a second embodiment of the invention, with a section plane perpendicular to the axis of rotation of the machine.

A synchronous machine according to an alternative embodiment is shown in FIG. 7, in section along a section plane orthogonal to the axis A of the rotor.

Here, the machine comprises six Hall-effect sensors 6 distributed over the entire periphery of the rotor. The sensors 6 are spaced two by two at 60° and cover the entire range of angular displacement of the rotor.

In this embodiment, a ring 7' integral with the stator accomplishes a localized amplification of the magnetic field, as described previously with relation to the part 7 of FIG. 3.

The ring 7' is in the form of a sector of a metal cylinder, of iron for example. Just as for the machine of FIG. 3, each magnetic sensor 6 is associated with an elevated radial thickness zone of the ring 7'. Two consecutive zones of elevated thickness are connected by a zone of small thickness.

The ring 7' allows reducing the uncertainty of detection of the change of orientation of the normal component of the magnetic field, at each of the magnetic sensors 6. The shape of the ring 7' allows good adjustment of the positions of the sensors 6 and further increases the precision of detection of the angular position of the rotor.

This embodiment is advantageous because the detection of the position of the rotor is improved over the entire range of angular displacement of the rotor.

The invention claimed is:

1. An electrical machine comprising a rotor and a stator, the rotor being movable in rotation relative to the stator around an axis of rotation and including a plurality of permanent magnets or a plurality of electromagnets, the stator including a plurality of windings integral with the stator and able to be supplied by an electrical current so as to drive the rotor in rotation relative to the stator, the stator comprising a first magnetic sensor comprising a first detection surface and a second magnetic sensor comprising a second detection surface, the first magnetic sensor and the second magnetic sensor being positioned on a same section plane orthogonal to the axis of rotation, the electrical machine comprising a first angular sector along which the first magnetic sensor is positioned and a second angular sector along which the second magnetic sensor is positioned, the first magnetic sensor being configured to detect a first change of direction of a first normal component of a magnetic field generated by the plurality of permanent magnets or the plurality of electromagnets, the first normal component being orthogonal to the first detection surface, the second magnetic sensor being configured to detect a second change of direction of a second normal component of the magnetic field generated by the plurality of permanent magnets or the plurality of electromagnets, the second normal component being orthogonal to the second detection surface, the electrical machine further comprising a metal part that is integral with the stator, the metal part comprising:

a first amplification zone extending in the first angular sector, a second amplification zone extending in the second angular sector, a third zone extending from the first amplification zone until the second amplification zone, wherein a radial thickness of the third zone in the section plane is less than a radial thickness of the first amplification zone and is less than a thickness of the second amplification zone in the section plane.

2. The electrical machine according to claim 1, wherein the first angular sector in which the first amplification zone extends has an angular amplitude between 10 degrees and 30 degrees, and the second angular sector in which the second amplification zone extends has an angular amplitude between 10 degrees and 30 degrees.

3. The electrical machine according to claim 2, wherein the angular amplitude of the second angular sector is 20 degrees.

4. The electrical machine according to claim 1, wherein the metal part has a shape of a ring or a shape of a ring sector.

5. The electrical machine according to claim 1, wherein the first magnetic sensor comprises a plurality of first magnetic sensors distributed in proximity to the first amplification zone at angular positions regularly spaced along an entire perimeter of the electrical machine, and the second magnetic sensor comprises a plurality of second magnetic sensors distributed in proximity to the second amplification zone at angular positions regularly spaced along the entire perimeter of the electrical machine.

6. The electrical machine according to claim 5, wherein the plurality of first magnetic sensors is three first magnetic sensors and the plurality of second magnetic sensors is three second magnetic sensors, and the three first magnetic sensors and the three second magnetic sensors are spaced two by two at 60 degrees.

7. The electrical machine according to claim 1, wherein the first magnetic sensor comprises a plurality of first magnetic sensors and at least one of the plurality of first magnetic sensors comprises a Hall-effect probe, and wherein the second magnetic sensor comprises a plurality of second magnetic sensors and at least one of the plurality of second magnetic sensors comprises a Hall-effect probe.

8. The electrical machine according to claim 1, wherein the metal part is configured to amplify, at the first detection surface, a first gradient of the first normal component orthogonal to the first detection surface of the magnetic field produced by the plurality of permanent magnets or by the plurality of electromagnets, and the metal part is configured to amplify, at the second detection surface, a second gradient of the second normal component orthogonal to the second detection surface of the magnetic field produced by the plurality of permanent magnets or by the plurality of electromagnets.

9. The electrical machine according to claim 1, wherein the first angular sector in which the first amplification zone extends has an angular amplitude equal to 20 degrees, and wherein the second angular sector in which the second amplification zone extends has an angular amplitude equal to 20 degrees.

* * * * *